(12) United States Patent
Kegel (10) Patent No.: US 9,092,486 B2
(45) Date of Patent: Jul. 28, 2015

(54) EXTENSIBLE I/O ACTIVITY LOGS

(71) Applicant: Advanced Micro Devices, Inc., Sunnyvale, CA (US)

(72) Inventor: Andrew G. Kegel, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/146,565

(22) Filed: Jan. 2, 2014

(65) Prior Publication Data
US 2015/0186240 A1   Jul. 2, 2015

(51) Int. Cl.
*G06F 11/30* (2006.01)

(52) U.S. Cl.
CPC ........ *G06F 11/3051* (2013.01); *G06F 11/3065* (2013.01)

(58) Field of Classification Search
CPC ............ G06F 12/0246; G06F 11/1471; G06F 12/1081; G06F 11/3065; H04L 49/90; H04L 49/901; H04L 49/9031
See application file for complete search history.

(56) References Cited

U.S. PATENT DOCUMENTS

| | | | | |
|---|---|---|---|---|
| 6,145,061 | A * | 11/2000 | Garcia et al. | 711/154 |
| 2004/0013406 | A1 * | 1/2004 | Barton et al. | 386/69 |
| 2004/0125799 | A1 * | 7/2004 | Buer | 370/389 |
| 2009/0300232 | A1 * | 12/2009 | Chen | 710/33 |
| 2011/0185107 | A1 * | 7/2011 | Yano et al. | 711/103 |

OTHER PUBLICATIONS

Steven W. Smith, Ph.D., "The Scientist and Engineer's Guide to Digital Signal Processing", Circular Buffering, printed Jul. 22, 2013, 2 pages. http://www.dspguide.com/ch28/2.htm.
TW Burger, Intel ® Virtualization Technology for Directed I/O (VT-d): Enhancing Intel Platforms for Efficient Virtualization of I/O Devices, Mar. 5, 2012, 8 pages. http://software.intel.com/en-us/articles/intel-virtualization-technology-for-directed-io-vt-d-enhancind-intel-platforms-for-efficient-virtualization-of-io-devices.
"AMD I/O Virtualization Technology (IOMMU) Specification", Revision 2.00, Mar. 24, 2011, 167 pages, Advanced Micro Devices, Inc.
John Morris, "Data Structures and Algorithms", Section 3.2 Lists, 1998, 3 pages. http://www.cs.auckland.ac.nz/software/AlgAnim/lists.html.

* cited by examiner

*Primary Examiner* — Idriss N Alrobaye
*Assistant Examiner* — Ronald Modo
(74) *Attorney, Agent, or Firm* — Park, Vaughan, Fleming & Dowler LLP (57) ABSTRACT

A method of managing peripherals is performed in a device coupled to a processor in a computer system. In the method, information associated with I/O activity for one or more peripherals is recorded in a first segment of a log. A second segment of the log is identified based on a next-segment pointer associated with the first segment of the log. In response to detecting a lack of available capacity in the first segment of the log, information associated with further I/O activity for the one or more peripherals is recorded in the second segment of the log.

16 Claims, 10 Drawing Sheets

EXTENSIBLE I/O ACTIVITY LOGS

TECHNICAL FIELD

The present embodiments relate generally to management of peripherals in computing systems, and more specifically to management of logs that store information about input/output (I/O) activity.

BACKGROUND

An I/O memory management unit (IOMMU) may store information about I/O activity in one or more logs. It may be desirable to resize these logs during operation. Pausing I/O activity to resize a log will degrade system performance, however, and may cause system failure.

SUMMARY

Embodiments are disclosed in which a log for storing information associated with I/O activity includes multiple segments linked by respective pointers.

In some embodiments, a method of managing peripherals is performed in a device coupled to a processor in a computer system. In the method, information associated with I/O activity for one or more peripherals is recorded in a first segment of a log. A second segment of the log is identified based on a next-segment pointer associated with the first segment of the log. In response to detecting a lack of available capacity in the first segment of the log, information associated with further I/O activity for the one or more peripherals is recorded in the second segment of the log.

In some embodiments, a device to be coupled to a processor in a computer system includes a first set of register fields to store a first set of parameters. The first set of parameters defines a current segment of a log for recording information associated with I/O activity for one or more peripherals. The first set of register fields includes a field for a next-segment pointer. The device also includes log control circuitry to identify a second set of parameters defining a next segment of the log based on the next-segment pointer and to replace the first set of parameters with the second set of parameters in the first set of register fields in response to detection of a lack of available capacity in the current segment of the log.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1A:
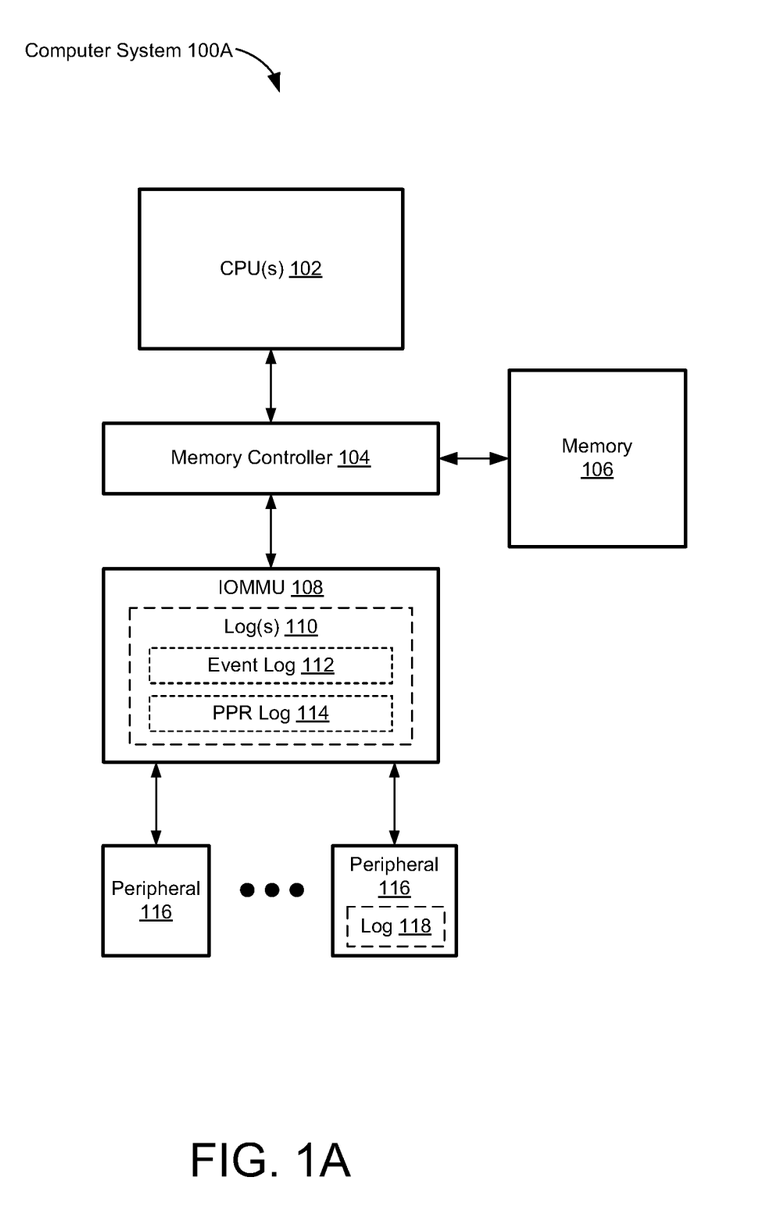
FIGS. 1A and 1B are block diagrams of computer systems in accordance with some embodiments.

FIG. 1A is a block diagram of a computer system 100A in accordance with some embodiments. The computer system 100A includes one or more CPUs 102, memory 106, and peripherals 116. The one or more CPUs 102 may each include one or more processor cores. The memory 106 includes main memory and may include one or more levels of cache memory. (The one or more CPUs 102 may also include one or more levels of cache memory.) In some embodiments, the main memory is implemented in dynamic random access memory (DRAM) and the one or more levels of cache memory are implemented in static random access memory (SRAM). Examples of peripherals 116 include, but are not limited to, network interface cards (NICs), other input/output (I/O) devices, and storage devices (e.g., hard-disk drives, solid-state drives such as flash drives, etc.).

A memory controller 104 couples the one or more CPUs 102 to the memory 106, thereby providing the one or more CPUs 102 with access to the memory 106.

The peripherals 116 are coupled to an input/output memory management unit (IOMMU) 108, which is coupled to the memory controller 104. The IOMMU 108 and memory controller 104 thus couple the peripherals 116 to the one or more CPUs 102 and to the memory 106. The IOMMU 108 may also be referred to, for example, as a peripheral MMU, a system MMU, a translation agent system, or virtualization technology for directed I/O (Vt-d). The IOMMU controls I/O activity for the peripherals 116. Among other functions, the IOMMU 108 performs address translation for the peripherals 116: it translates virtual addresses provided by the peripherals 116 into physical addresses in the memory 106. The peripherals 116 may use these physical addresses to perform direct memory access (DMA) in the memory 106, through the IOMMU 108. Such DMA operations are an example of the I/O activity that the IOMMU 108 controls.

The IOMMU 108 records information associated with the I/O activity in one or more logs 110. The one or more logs 110 may also be referred to as queues: they queue the information regarding the I/O activity for subsequent consumption by software running on the one or more CPUs 102. One example of a log 110 is an event log 112, which stores events (e.g., including errors) associated with the peripherals 116. Another example of a log 110 is a peripheral page request (PPR) log 114, which stores PPRs from the peripherals 116. A PPR resembles a page fault in that it requests allocation of a page in the memory 106. But unlike page faults, which are synchronous, PPRs are issued as interrupts, which are asynchronous. The event log 112 and the PPR log 114 are merely two examples of logs 110; other examples are possible. For example, a log 110 may store information regarding interrupts issued by the peripherals 116, user connections established through the peripherals 116, or failed attempts to connect to the computer system 100A through the peripherals 116.

Furthermore, a peripheral 116 (e.g., a NIC) may record information associated with its activity (e.g., information as described for the one or more logs 110) in a log 118.

While the one or more logs 110 are shown as being situated in the IOMMU 108, and the log 118 is shown as being situated in a peripheral 116, entries in the one or more logs 110 and/or the log 118 may be stored in the memory 106 (e.g., in main memory). For example, a log 110 or log 118 may be divided into multiple segments, each of which includes entries stored in the memory 106 (e.g., in main memory). In some embodiments, each segment is implemented as a buffer (e.g., a circular buffer).

The IOMMU 108 includes registers that store pointers to entries in a respective segment of each of the one or more logs 110, along with other information that defines the respective segment. For example, a respective segment of a log 110 may be implemented as a circular buffer defined by parameters stored in registers in the IOMMU 108 and having entries stored in the memory 106 (e.g., in main memory), as described below with respect to FIG. 2. Because of the presence of these registers in the IOMMU 108, the one or more logs 110 are considered to be part of the IOMMU 108, even with the entries being stored in the memory 106. Similarly, a peripheral 116 may include registers that store pointers to entries in a respective segment of a log 118, along with other information that defines the respective segment. Because of the presence of these registers in the peripheral 116, the log 118 is considered to be part of the peripheral 116, even with the entries being stored in the memory 106.

In some embodiments, the memory controller 104 is integrated with the one or more CPU(s) 102, such that it is situated on the same semiconductor die (and thus the same chip) as the one or more CPU(s) 102. Alternatively, the memory controller 104 may be situated on a separate chip from the one or more CPU(s) 102. The IOMMU 108 may be situated on the same chip as the memory controller 104 and/or the one or more CPU(s) 102, or on a different chip.

Figure 1B:
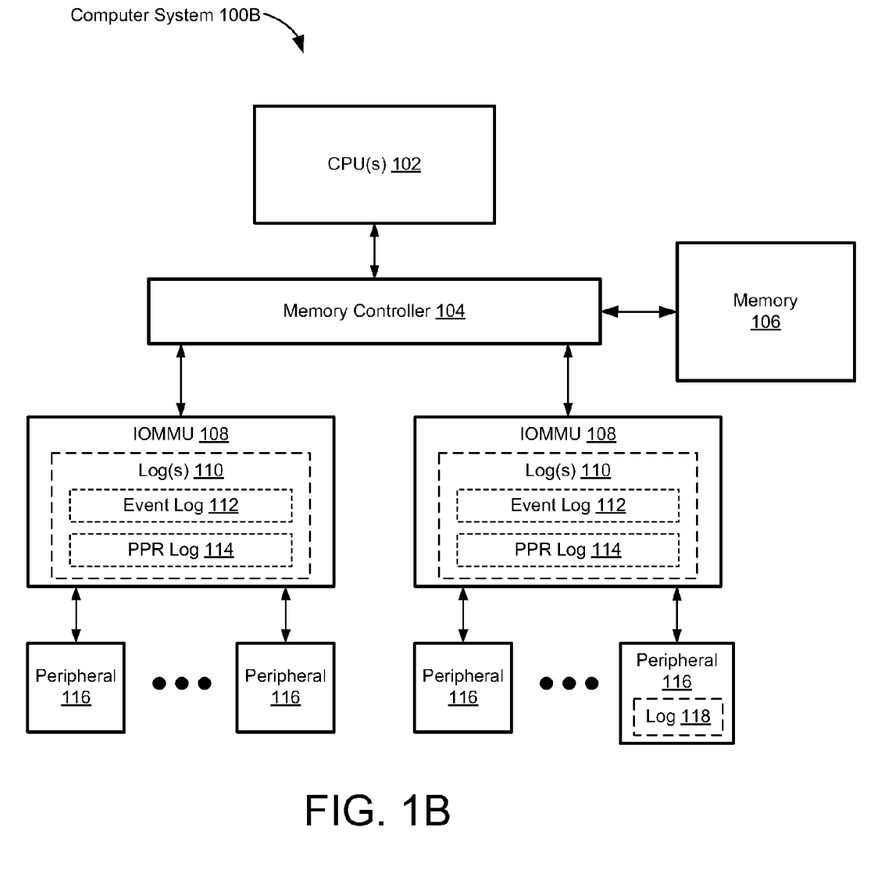

FIG. 1B is a block diagram of another computer system 100B in accordance with some embodiments. In the computer system 100B, a first group of peripherals 116 is coupled to a first IOMMU 108 and a second group of peripherals 116 is coupled to a second IOMMU 108. The first and second IOMMUs 108 are coupled to the memory controller 104 and thereby to the one or more CPUs 102 and the memory 106. The first IOMMU 108 controls I/O activity for the first group of peripherals 116 and includes one or more logs 110 in which it records information about this I/O activity. Likewise, the second IOMMU 108 controls I/O activity for the second group of peripherals 116 and includes one or more logs 110 in which it records information about this I/O activity. A peripheral 116 may include a log 118 to store information regarding its activity.

The computer systems 100A and 100B are merely examples of computer systems that use IOMMUs 108; other examples are possible. For example, a computer system may include more than two IOMMUs 108, each coupled to a respective group of peripherals 116 and including one or more logs 110. Each IOMMU 108 may be coupled to respective peripherals 116 through an I/O hub, which may include integrated peripherals 116.

Figure 2:
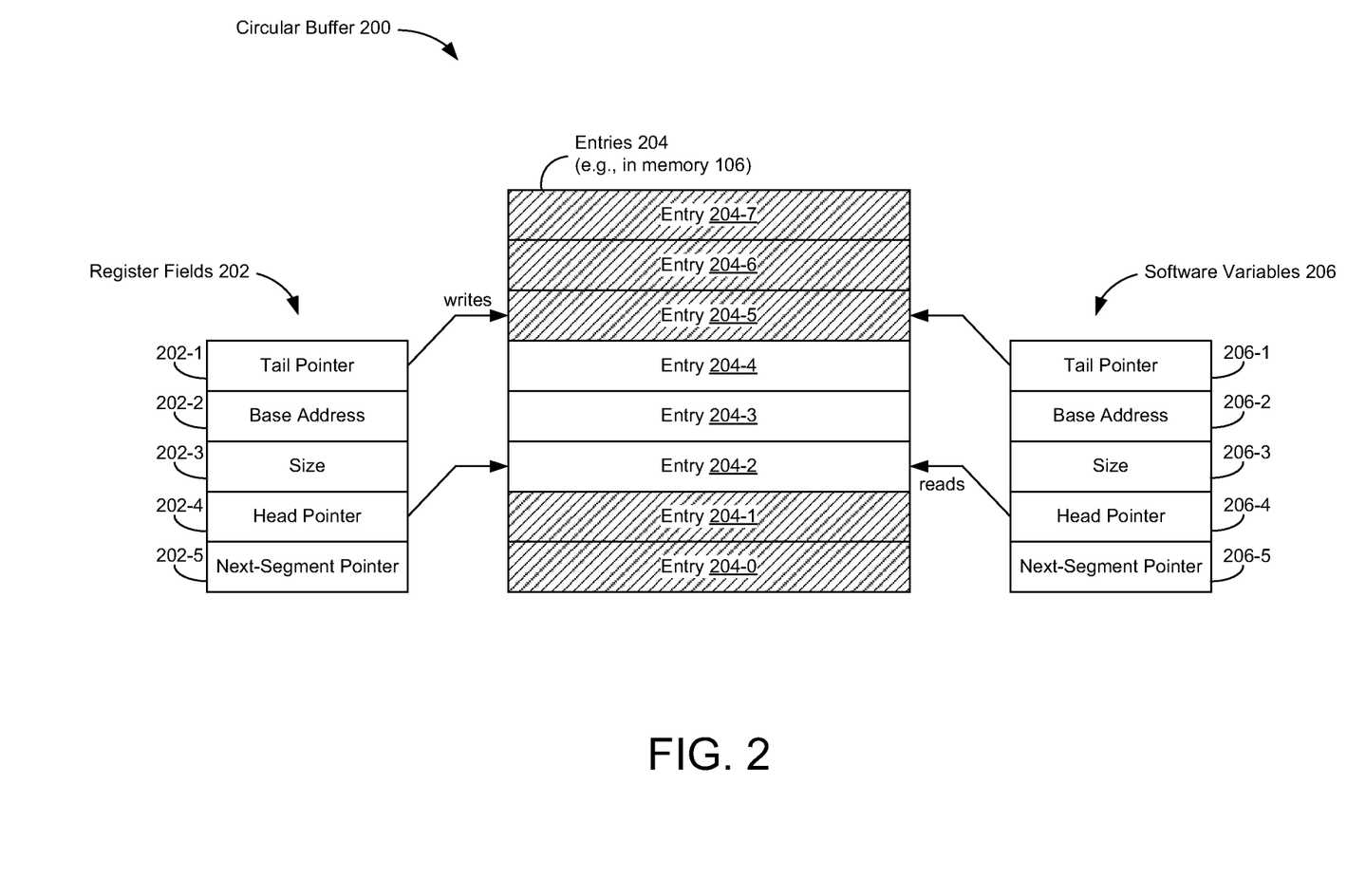
FIG. 2 is a block diagram of a circular buffer used to implement a segment of a log in accordance with some embodiments.

FIG. 2 is a block diagram of a circular buffer 200 used to implement a segment of a log 110 or log 118 (FIGS. 1A-1B) in accordance with some embodiments. Register fields 202 for the circular buffer 200 include a tail pointer register field 202-1 to store a tail pointer for the circular buffer 200, a base address register field 202-2 to store a base address of the circular buffer 200, a size register field 202-3 to store a size of the circular buffer 200, and a head pointer register field 202-4 to store a head pointer for the circular buffer 200. The register fields 202 also include a next-segment pointer register field 202-5 to store a pointer to a next segment in the log 110 or log 118. For example, the next-segment pointer register field 202-5 stores a pointer to (e.g., an address of) a block of memory in the memory 106 (e.g., in main memory) that stores a base address, size, head pointer, tail pointer, and/or next-segment pointer for the next segment.

The register fields 202 are included in one or more registers in an IOMMU 108 or peripheral 116. Two or more of the register fields 202 may be in the same register. Alternatively, each of the register fields 202 may be in a separate register.

A plurality of entries 204 (e.g., entries 204-0 through 204-7) in the circular buffer 200 are stored in the memory 106 (e.g., in main memory). The base address is the address of a first entry 204-0 or portion thereof. The entries 204-0 through 204-7 are indexed by offsets from the first entry 204-0, such that the base address plus the size is the address of the last entry 204-7. In one example, each entry is 128 bits (i.e., 16 bytes) and the offsets are multiples of 16 (e.g., the index for entry 204-0 is +00, the index for entry 204-1 is +16, and the index for entry 204-7 is +112). In this example, the circular buffer 200 is a 128-byte buffer. In general, however, the size and number of entries 204, and thus the overall size of the circular buffer 200, varies for different implementations.

In some embodiments, the head pointer points to the first valid entry 204 and the tail pointer points to the first invalid (i.e., empty) entry 204. The head pointer register field 202-4 thus stores the index for the first valid entry 204 and the tail pointer register field 202-1 thus stores the index for the first invalid entry 204. In the example of FIG. 2, the circular buffer 200 currently has three valid entries: entries 204-2, 204-3, and 204-4. The head pointer points to entry 204-2, which is the first valid entry 204. The tail pointer points to entry 204-5, which is the first invalid entry. (FIG. 2 merely illustrates one example of a pointer convention for a circular buffer; other examples are possible.)

When the IOMMU 108 or peripheral 116 creates a new entry in the log 110 or log 118, it writes to the entry 204 to which the tail pointer points and then increments the tail pointer (wrapping around as necessary). If incrementing the tail pointer would cause the tail pointer to equal the head pointer (i.e., would cause the parameter in the tail pointer register field 202-1 to equal the parameter in the head pointer register field 202-4), then the circular buffer 200 is full. Adding another entry 204 when the circular buffer 200 is full would result in overflow.

Software running on the one or more CPUs 102 (FIGS. 1A and 1B) tracks variables 206 associated with the circular buffer 200. The variables 206 correspond to the register fields 202 and include, for example, a tail pointer variable 206-1, base address variable 206-2, size variable 206-3, head pointer variable 206-4, and next-segment pointer variable 206-5. The variables 206 therefore store the parameters that define the circular buffer. In some embodiments, when the software reads, and thus consumes, an entry 204, it consumes the entry at the head of the circular buffer 204 (i.e., the first valid entry 204), as identified by the head pointer variable 206-4. For example, it consumes entry 204-2. The software then increments the head pointer variable 206-4 (wrapping around as necessary) and writes the incremented value of the head pointer variable 206-4 to the head pointer register field 202-4. In the example of FIG. 2, the head pointer register field 202-4 would then store a pointer to the entry 204-3, as would the head pointer variable 206-4.

The head pointer and tail pointer may chase each other around the circular buffer 200 without the circular buffer 200 becoming full. However, when the circular buffer 200 is full, or in response to an overflow condition, the parameters in the register fields 202 are replaced with parameters for a next segment, as identified using the next-segment pointer in the next-segment pointer register field 202-5. For example, the parameters for the next segment are read from the memory 106 (FIGS. 1A-1B) in response to a determination that there is a lack of available capacity in the circular buffer (e.g., in response to a determination that the circular buffer is full or that there is an overflow condition). Alternatively, the parameters for the next segment are read from the memory 106 before any determination that there is a lack of available capacity in the circular buffer. For example, the parameters for the next segment are obtained in response to a determination that a number of valid entries in the current segment equals or exceeds a threshold and are cached until the determination that there is a lack of available capacity in the circular buffer 200. Once this determination is made, the parameters for the current segment are replaced with the parameters for the next segment. The next segment thus becomes the new current segment.

Accordingly, the next segment is a new circular buffer 200 used to store new entries in the log 110 or log 118. Use of the next segment allows the total size of the log 110 or log 118 to grow without interrupting I/O activity. The log 110 or log 118 therefore is extensible. The head and tail pointers for the next segment (i.e., the new current segment) are initially set equal to each other, to indicate that the new circular buffer 200 is empty. The parameters in the tail pointer register field 202-1 and the head pointer register field 202-4 therefore are initially equal. In some embodiments, the block of memory in the memory 106 that stores the parameters for the next segment includes a head pointer parameter but not a tail pointer parameter (or vice-versa). This parameter is written to both the tail pointer register field 202-1 and the head pointer register field 202-4 when the next segment replaces the current segment.

Figure 3:
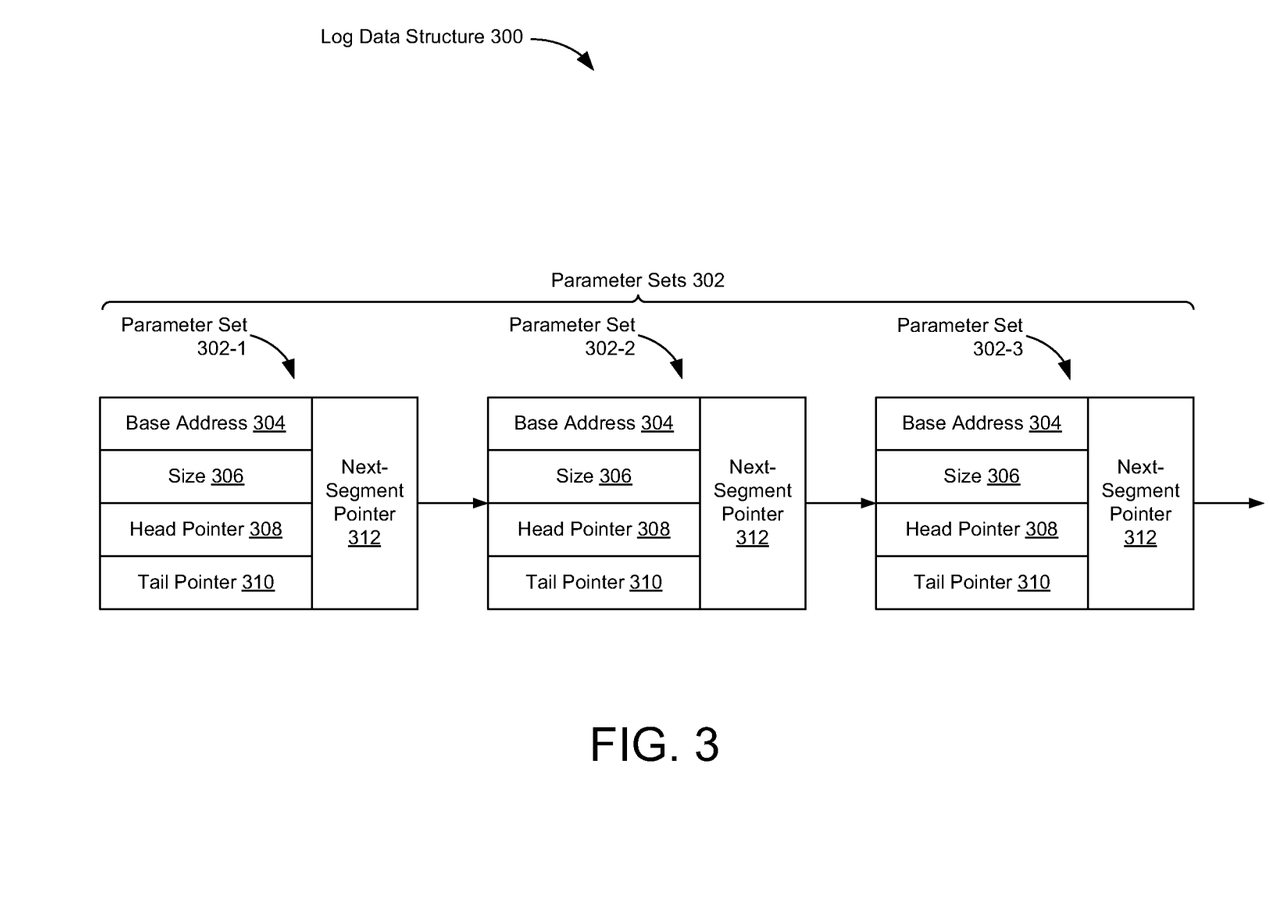
FIG. 3 is a schematic block diagram of a data structure for a log in accordance with some embodiments.

FIG. 3 is a schematic block diagram of a data structure 300 for a log 110 or log 118 in accordance with some embodiments. In the data structure 300, sets of parameters 302 that define respective circular buffers 200 (FIG. 2) are linked by respective next-segment pointers 312. The parameter set 302-1 includes a base address 304, size 306, head pointer 308, and tail pointer 310 for a first circular buffer 200. The parameter sets 302-2, 302-3, etc. include similar parameters for successive circular buffers 200. In some embodiments, either the head pointer 308 or tail pointer 310 is omitted. In some embodiments, the size 306 is replaced with a final address for the corresponding circular buffer 200. Other variations are possible.

The next-segment pointer 312 in the parameter set 302-1 points to a block of memory in the memory 106 that stores the parameter set 302-2. Similarly, the next segment pointer 312 in the parameter set 302-2 points to a block of memory that stores the parameter set 302-3, and the next segment pointer 312 in the parameter set 302-3 may point to a block of memory that stores a subsequent parameter set. In some embodiments, each next-segment pointer 312 includes a validity indicator (e.g., a validity bit 404, FIG. 4A) to indicate whether it points to a block of memory that stores a valid parameter set 302 for a next segment. If the validity indicator is set, the block of memory stores a valid parameter set 302. If the validity indicator is not set, the block of memory does not store a valid parameter set 302, and there is no next segment available. The validity indicator not being set therefore indicates that the end of the data structure 300 has been reached.

In some embodiments, instead of including a validity indicator, a next-segment pointer 312 may be set to a specified value (e.g., all zeros or all ones) to indicate that it is not valid and thus corresponds to the end of the data structure 300.

One of the parameter sets 302 is stored in the register fields 202 (FIG. 2) at a given point in time, and may be replaced with another one of the parameter sets 302, as identified by a respective next-segment pointer 312. This replacement is performed in response to a lack of available capacity in the corresponding circular buffer 200, and thus in the corresponding segment of the log 110 or 118.

Figure 4A:
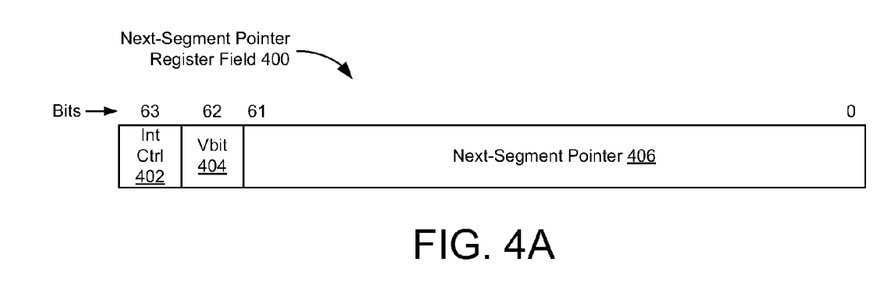
FIGS. 4A and 4B show examples of register fields for a next-segment pointer in accordance with some embodiments.

FIG. 4A shows a register field 400 for a next-segment pointer 312 (FIG. 3) in accordance with some embodiments. The register field 400 is an example of a next-segment register field 202-5 (FIG. 2). The register field 400 includes a next-segment pointer 406, an interrupt control (Int Ctrl) bit 402, and a validity bit (Vbit) 404. The next-segment pointer 406 stores the address of a block of memory storing a parameter set 302 for a next segment in a log 110 or 118. The validity bit 404 functions as described with respect to FIG. 3. The interrupt control bit 402, when set (e.g., to '1'), enables an interrupt to be issued when a new parameter set 302 is loaded into the register fields 202. This interrupt notifies the one or more CPUs 102 that a new segment of a log 110 or 118 is now in use. When the interrupt control bit 402 is not set (e.g., equals '0'), generation of this interrupt is disabled.

Figure 4B:
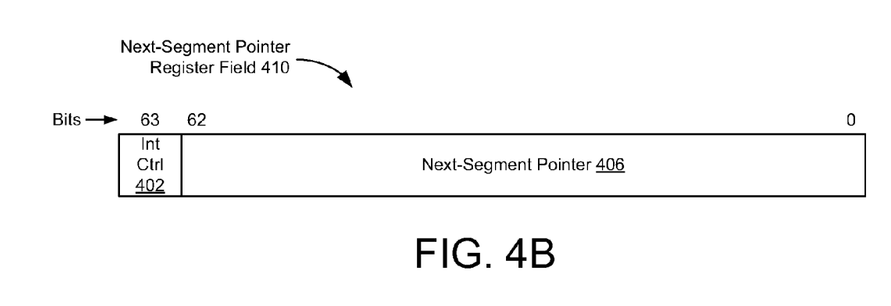

FIG. 4B shows an alternative register field 410 for a next-segment pointer 312 (FIG. 3) in accordance with some embodiments. The register field 410 includes the next-segment pointer 406 and interrupt control bit 402, but omits the validity bit 404. Instead, the next-segment pointer 406 may be set to a specified value to indicate that it is not valid and does not point to a block of memory storing a parameter set 302 for a next segment.

In some embodiments, the interrupt control bit 402 is also omitted from a register field for a next-segment pointer 312 (e.g., from a next-segment pointer register field 202-5, FIG. 2). Instead, for example, an IOMMU 108 or peripheral 106 includes a control register 604 (FIG. 6) to store an interrupt control bit. In another alternative, an IOMMU 108 or peripheral 116 may be configured always to issue an interrupt when a new parameter set 302 is loaded into the register fields 202.

In some embodiments, the register field 400 (FIG. 4A) or 410 (FIG. 4B) is implemented in a dedicated register (e.g., a 64-bit register) in an IOMMU 108 or peripheral 116. Alternatively, the register field 400 is combined with one or more other register fields in a register in the IOMMU 108 or peripheral 116.

Figure 5A:
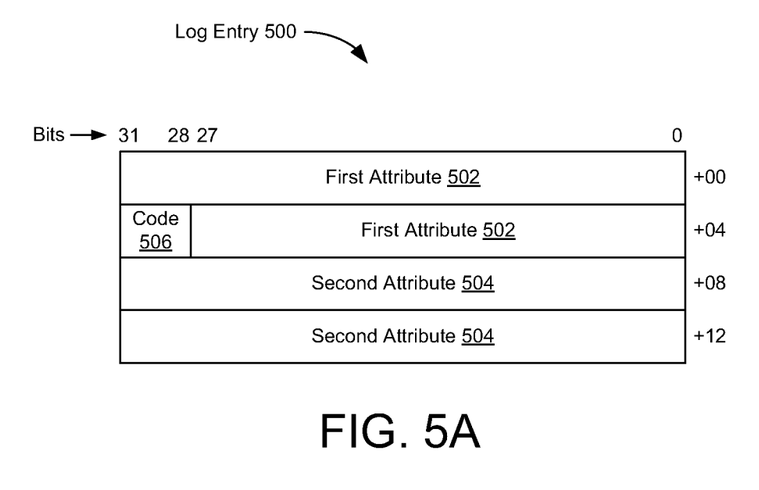
FIGS. 5A and 5B show examples of entries in a log in accordance with some embodiments.

FIG. 5A shows an entry 500 in a log 110 or log 118 in accordance with some embodiments. The entry 500 is an example of an entry 204 (FIG. 2). In the example of FIG. 5A, the entry 500 is a 128-bit entry divided into four 32-bit sections. More generally, the size and structure of the entry 500 may vary from embodiment to embodiment. The entry 500 includes a first attribute 502, a second attribute 504, and a code 506 that specifies a type of attribute for the first attribute 502 and second attribute 504. The code 506 indicates how to interpret the first attribute 502 and second attribute 504. The first attribute 502 and second attribute 504 therefore may be referred to as code-dependent operands.

Figure 5B:
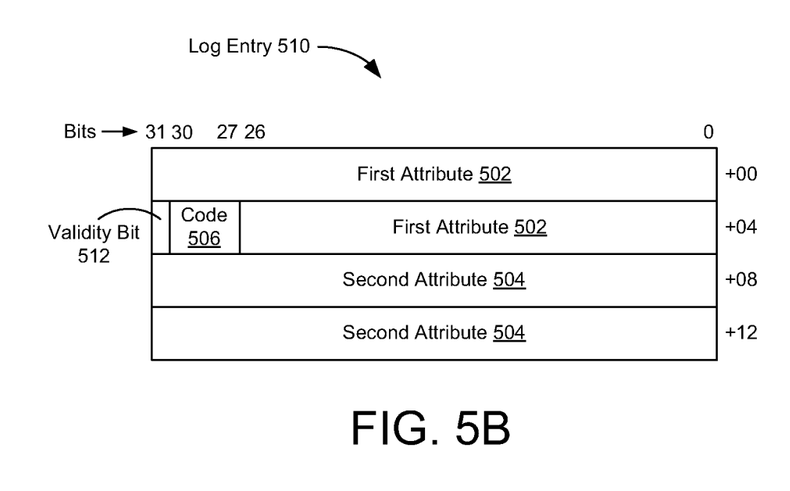

FIG. 5B shows an alternative entry 510 in a log 110 or log 118 in accordance with some embodiments. In addition to the first attribute 502, second attribute 504, and code 506, the entry 510 includes a validity bit 512. When set (e.g., to '1'), the validity bit 512 indicates that the entry 510 is valid, and thus has not yet been consumed by software. The IOMMU 108 or peripheral 116 is configured to create entries 510 with the validity bit 512 set. Software may subsequently reset the validity bit 512 (e.g., to '0') when it consumes the entry 510. When reset, the validity bit 512 indicates that the entry 510 is no longer valid and therefore has been consumed.

Alternatively, the code 506 is used to indicate whether an entry 500 (FIG. 5A) is valid. One or more (e.g., multiple) possible values of the code 506 are specified as indicating that the entry 500 is valid. The IOMMU 108 or peripheral 116 is configured to create entries 500 with codes 506 that indicate that the entries 500 are valid. When software consumes an entry 500, it changes the code 506 to indicate that the entry 500 is now invalid.

As discussed, switching to a new segment of a log 110 or log 118 may involve effectively creating a new circular buffer 200 (FIG. 2) by storing a new parameter set 302 (FIG. 3) in the register fields 202 (FIG. 2). The new circular buffer 200 stores new entries 204 in a new segment of a log 110 or log 118, while the old circular buffer 200 stores old entries 204 in an old segment of the log 110 or log 118. Software may not have consumed all of the old entries 204 when the new circular buffer 200 is created and the new segment thus enabled. However, the parameter set 302 for the old segment is no longer stored in the register fields 202, and therefore is no longer available, once the new segment is enabled. The software therefore may not be able to use the parameter set 302 for the old segment to determine which of the old entries 204 have been consumed. Instead, software may use the validity bit 512 or the code 506 to determine whether respective old entries 510 or 500 are valid and thus are to be consumed. The validity bit 512 or code 506 acts as a validity indicator that allows the software to make this determination in the absence of the head pointer 308 and tail pointer 310 (FIG. 3) for the old segment.

Figure 6:
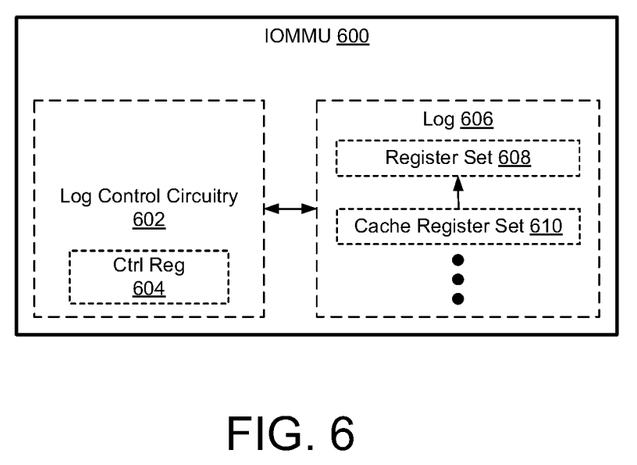
FIG. 6 is a block diagram of a portion of an IOMMU in accordance with some embodiments.

FIG. 6 is a block diagram of a portion of an IOMMU 600 in accordance with some embodiments. The IOMMU 600 is an example of an IOMMU 108 (FIGS. 1A-1B). Log control circuitry 602 is coupled to a log 606, which is an example of a log 110 (FIGS. 1A-1B). The log 606 may be implemented in multiple segments using respective circular buffers 200 (FIG. 2). The log 606 has a register set 608 that includes, for example, the register fields 202 (FIG. 2). In some embodiments, the log 606 also includes one or more cache register sets 610 to cache one or more parameter sets 302 associated with respective segments that are not currently being used to store information regarding I/O activity but may subsequently be used. The one or more parameter sets 302 cached in the one or more cache register sets 610 are identified using next segment pointers 312, as described with respect to FIG. 3. In some embodiments, the register set 608 is exposed to software while the one or more cache register sets 610 are not exposed to software.

The log control circuitry 602 monitors the log 606 to determine whether there is a lack of availability of entries 204 (FIG. 2) in the current segment. If the log control circuitry 602 detects a lack of availability, it replaces a parameter set 302 for the current segment with a parameter set 302 for a next segment. For example, it transfers a parameter set 302 for the next segment from a cache register set 610 to the register set 608. Alternatively, the log control circuitry 602 reads the parameter set 302 for the next segment from the memory 106 (FIGS. 1A-1B).

In some embodiments, the log control circuitry 602 includes a control register (Ctrl Reg) 604 to store a value to enable or disable the sending of an interrupt when the lack of availability in the current segment is detected and the next segment is enabled. For example, sending of the interrupt is enabled when the control register 604 stores a first value and disabled when the control register 604 stores a second value.

In some embodiments, the log control circuitry 602 is configured to create entries in the log 606 that have valid indicators (e.g., set validity bits 512, FIG. 5B, or valid codes 506, FIG. 5A).

In some embodiments, a peripheral 116 may include log control circuitry 602 and a log 606, by analogy to FIG. 6A. The log 606 thus may be an example of a log 118 and/or a log 110 (FIGS. 1A-1B).

Figure 7A:
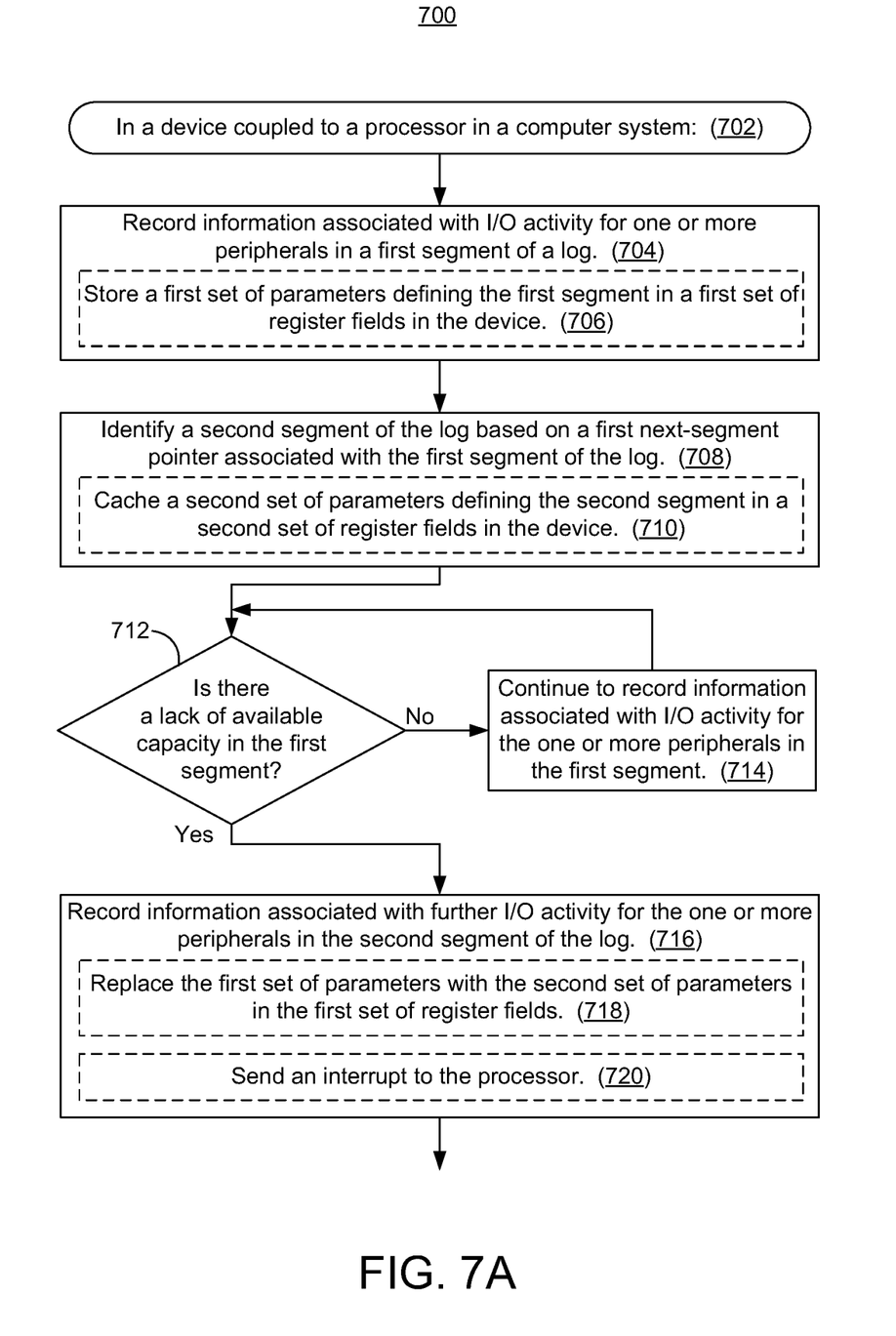
FIGS. 7A and 7B are flowcharts showing methods of managing peripherals in accordance with some embodiments.

FIG. 7A is a flowchart showing a method 700 of managing peripherals 116 in accordance with some embodiments. The method 700 is performed (702) in a device (e.g., an IOMMU 108 or peripheral 116, FIGS. 1A-1B) coupled to a processor (e.g., the one or more CPUs 102, FIGS. 1A-1B, or a portion thereof) in a computer system (e.g., the computer system 100A or 100B, FIGS. 1A-1B). For example, the method 700 may be performed by log control circuitry 602 (FIG. 6).

In the method 700, information associated with I/O activity for one or more peripherals 116 is recorded (704) in a first segment (e.g., a first circular buffer 200, FIG. 2) of a log 110 or log 118. In some embodiments, a first parameter set 302 defining the first segment is stored (706) in a first set of register fields (e.g., register fields 202, FIG. 2) in the device.

Recording the information may include setting a validity indicator (e.g., a validity bit 512 or code 506, FIGS. 5A-5B) in respective entries 200 (FIG. 2) to indicate that the respective entries are valid.

A second segment (e.g., a second circular buffer 200, FIG. 2) of the log 110 or log 118 is identified (708) based on a first next-segment pointer 312 (FIG. 3) associated with the first segment of the log 110 or log 118. In some embodiments, a second parameter set 302 defining the second segment is cached (710) in a second set of register fields (e.g., a cache register set 610, FIG. 6) in the device. This caching of the second parameter set 302 is performed, for example, in response to a determination that the available capacity of the first segment does not satisfy a threshold (e.g., a watermark). This determination may include determining that a number of valid entries 200 (FIG. 2) in the segment is greater than, or greater than or equal to, a specified value, or that a number of invalid (i.e., empty) entries 200 (FIG. 2) in the segment is less than, or less than or equal to, a specified value. This determination indicates that the first segment is filling up.

In some embodiments, identifying the second segment includes determining that the first next-segment pointer 312 is valid, and thus that the second parameter set 302 is valid, based on a validity indicator (e.g., a validity bit 404, FIG. 4A) in the first next-segment pointer 312.

It is determined (712) whether there is a lack of available capacity in the first segment. For example, it is determined whether the first segment is full or whether there is an overflow condition in the first segment.

If the first segment has capacity available (712—No), then information associated with I/O activity for the one or more peripherals 116 continues to be recorded (714) in the first segment. While the information is recorded, the determination 712 is made repeatedly to monitor the availability of capacity in the first segment.

If the first segment lacks available capacity (712—Yes), however, then information associated with further I/O activity for the one or more peripherals 116 is recorded (716) in the second segment of the log 110 or log 118. In some embodiments, the first parameter set 302 is replaced (718) with the second parameter set 302 in the first set of register fields (e.g., register fields 202, FIG. 2). For example, the second parameter set 302 is transferred from the second set of register fields (e.g., a cache register set 610, FIG. 6) to the first set of register fields (e.g., register fields 202, FIG. 2).

In some embodiments, an interrupt is sent (720) to the processor in response to the lack of available capacity in the first segment, to indicate that further I/O activity is being recorded (716) in the second segment.

In some embodiments, the order of the operations 708 and 712 is reversed, such that the second segment is identified (708) in response to the determination (712—Yes) that the first segment lacks available capacity.

Figure 7B:
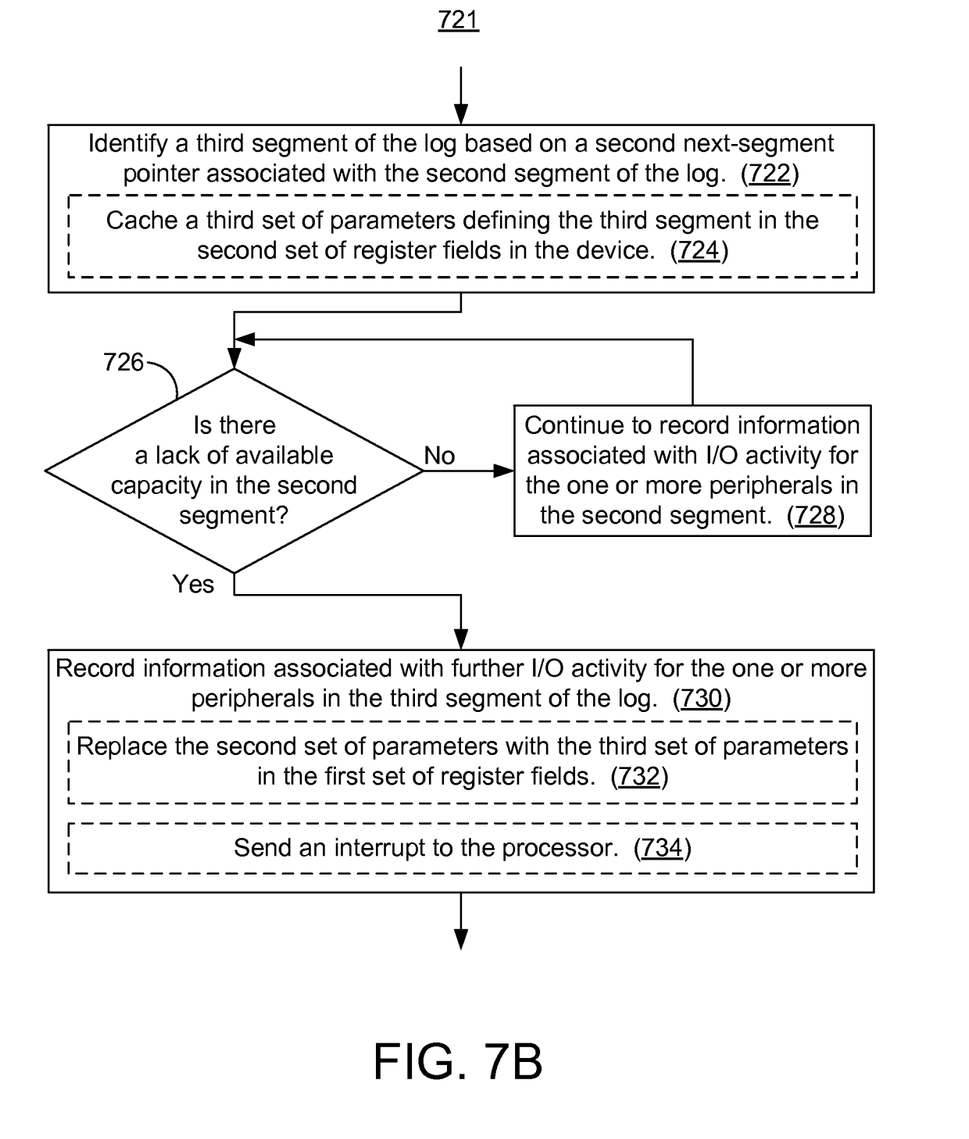

FIG. 7B is a flowchart showing a method 721 of managing peripherals 116 in accordance with some embodiments. The method 721 is a continuation of the method 700 (FIG. 7A) and is performed in the same device as the method 700. For example, the method 700 may be performed by log control circuitry 602 (FIG. 6).

A third segment (e.g., a third circular buffer 200, FIG. 2) of the log 110 or log 118 is identified (722) based on a second next-segment pointer 312 (FIG. 3) associated with the second segment of the log, by analogy to the operation 708 (FIG. 7A). In some embodiments, a third parameter set 302 defining the third segment is cached (724) in the second set of register fields (e.g., a cache register set 610, FIG. 6) in the device, by analogy to the operation 710 (FIG. 7A).

It is determined (726) whether there is a lack of available capacity in the second segment. The determination 726 is made in the manner described for the determination 712 (FIG. 7A).

If the first segment has capacity available (726—No), then information associated with I/O activity for the one or more peripherals 116 continues to be recorded (728) in the second segment. While the information is recorded, the determination 726 is made repeatedly to monitor the availability of capacity in the second segment.

If the second segment lacks available capacity (726—Yes), however, then information associated with further I/O activity for the one or more peripherals 116 is recorded (730) in the third segment of the log 110 or log 118. In some embodiments, the second parameter set 302 is replaced (732) with the third parameter set 302 in the first set of register fields (e.g., register fields 202, FIG. 2). For example, the third parameter set 302 is transferred from the second set of register fields (e.g., a cache register set 610, FIG. 6) to the first set of register fields (e.g., register fields 202, FIG. 2)

In some embodiments, an interrupt is sent (734) to the processor in response to the lack of available capacity in the second segment, to indicate that further I/O activity is being recorded (730) in the third segment.

In some embodiments, the order of the operations 722 and 726 is reversed, as described with respect to the operations 708 and 712 in the method 700 (FIG. 7A).

The methods 700 and 721 allow segments to be added to an extensible log 110 or 118 to avoid overflow (e.g., without pausing I/O activity). While the methods 700 and 721 include a number of operations that appear to occur in a specific order, it should be apparent that the methods 700 and 721 can include more or fewer operations, some of which can be executed serially or in parallel. An order of two or more operations may be changed, performance of two or more operations may overlap, and two or more operations may be combined into a single operation.

Figure 8:
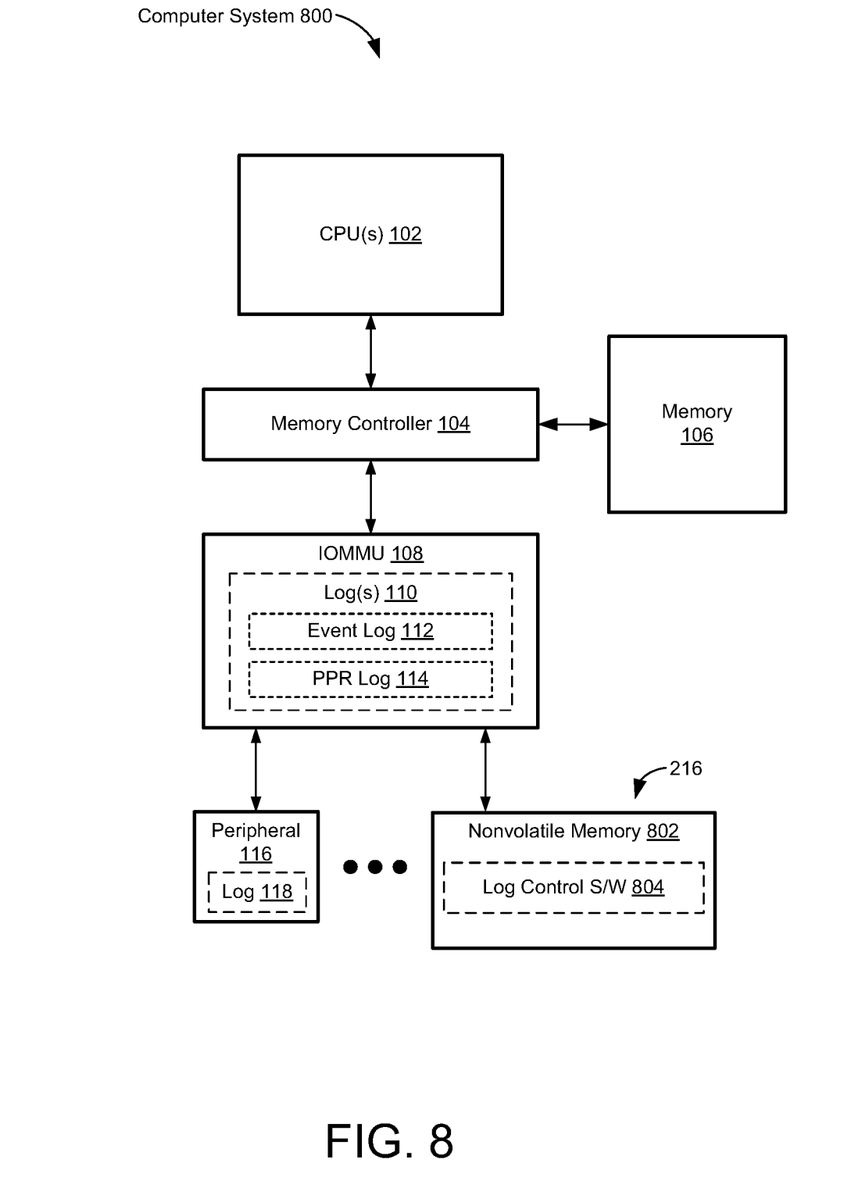
FIG. 8 is a block diagram of a computer system including nonvolatile memory in accordance with some embodiments.

FIG. 8 is a block diagram of a computer system 800 in which one of the peripherals 216 is a nonvolatile memory 802 in accordance with some embodiments. The computer system 800 is an example of a computer system 100A (FIG. 1A). The nonvolatile memory 802 includes a non-transitory computer-readable storage medium storing one or more programs with instructions configured for execution by the one or more CPUs 202. The one or more programs include log control software 804. In some embodiments, the log control software 804 includes instructions to track and update variables 206 (FIG. 2) storing respective parameter sets 302 (FIG. 3) and/or to provide a respective parameter set 302 to a device such as the IOMMU 108 or a peripheral 116. For example, the log control software 804 includes instructions to read and/or write the register fields 202 (FIG. 2) (e.g., in the register set 608, FIG. 6). The log control software 804 also includes instructions to consume respective entries 204 (FIG. 2) in a log 110 or 118 (e.g., based on a determination that a validity indicator for a respective entry 204 is set).

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing peripherals, comprising:
in a device coupled to a processor in a computer system:
recording information associated with I/O activity for one or more peripherals in a first segment of a log, the first segment of the log being defined by a first set of parameters that are stored in a first set of register fields in the device;
identifying a second segment of the log based on a first next-segment pointer associated with the first segment of the log, the second segment of the log being defined by a second set of parameters that are cached in a second set of register fields in the device, wherein the caching is performed in response to a determination that the available capacity of the first segment of the log does not satisfy a threshold; and
in response to detecting a lack of available capacity in the first segment of the log:
replacing the first set of parameters with the second set of parameters in the first set of register fields, the replacing comprising transferring the second set of parameters from the second set of register fields to the first set of register fields; and
recording information associated with further I/O activity for the one or more peripherals in the second segment of the log.

2. The method of claim 1, wherein:
the first segment of the log comprises a first circular buffer; and
the first set of parameters comprises the first next-segment pointer and further comprises a base address, head pointer, and tail pointer for the first circular buffer.

3. The method of claim 2, wherein the first set of parameters further comprises a size for the first circular buffer.

4. The method of claim 2, wherein:
the second segment of the log comprises a second circular buffer; and
the second set of parameters comprises a base address, head pointer, and tail pointer for the second circular buffer.

5. The method of claim 4, wherein the second set of parameters further comprises a size for the second circular buffer.

6. The method of claim 4, wherein the second set of parameters further comprises a second next-segment pointer to point to a third segment of the log, the method further comprising:
  identifying the third segment of the log based on the second next-segment pointer; and
  in response to detecting a lack of available capacity in the second segment of the log, recording information associated with further I/O activity for the one or more peripherals in the third segment of the log.

7. The method of claim 6, wherein the third segment of the log is defined by a third set of parameters; the method further comprising:
  in response to detecting the lack of available capacity in the second segment of the log, replacing the second set of parameters with the third set of parameters in the first set of register fields.

8. The method of claim 1, wherein:
  the first set of register fields is exposed to software; and
  the second set of register fields is not exposed to software.

9. The method of claim 1, further comprising sending an interrupt to the processor in response to detecting the lack of available capacity in the first segment of the log.

10. The method of claim 1, wherein detecting the lack of available capacity in the first segment of the log comprises identifying an overflow condition in the first segment of the log.

11. The method of claim 1, wherein recording information in the first and second segments of the log comprises setting a validity indicator in respective entries of the first and second segments of the log to indicate that the respective entries are valid.

12. The method of claim 1, wherein:
  the first next-segment pointer comprises a validity indicator; and
  identifying the second segment comprises determining that the first next-segment pointer is valid, based on the validity indicator.

13. A device to be coupled to a processor in a computer system, the device comprising:
  a first set of register fields to store a first set of parameters defining a current segment of a log for recording information associated with I/O activity for one or more peripherals, the first set of register fields comprising a field for a next-segment pointer; and
  log control circuitry to:
    identify a second set of parameters defining a next segment of the log based on the next-segment pointer, the second set of parameters cached in a second set of register fields in the device, wherein the caching is performed in response to a determination that the available capacity of the current segment of the log does not satisfy a threshold; and
    replace the first set of parameters with the second set of parameters in the first set of register fields in response to detection of a lack of available capacity in the current segment of the log, the replacing comprising transferring the second set of parameters from the second set of register fields to the first set of register fields.

14. The device of claim 13, wherein:
  the current segment and the next segment each comprises a circular buffer; and
  the first set of register fields further comprises a base address field, head pointer field, and tail pointer field.

15. The device of claim 14, wherein the first set of register fields further comprises a size field.

16. A device to be coupled to a processor in a computer system, the device comprising:
  means for recording information associated with I/O activity for one or more peripherals in a current segment of a log, the current of the log being defined by a first set of parameters that are stored in a first set of register fields in the device; and
  means for identifying a next segment of the log, the next segment of the log being defined by a second set of parameters that are cached in a second set of register fields in the device, wherein the caching is performed in response to a determination that the available capacity of the current segment of the log does not satisfy a threshold; and
  means for replacing the current segment with the next segment in response to detecting a lack of available capacity in the current segment, the replacing comprising replacing the first set of parameters with the second set of parameters in the first set of register fields, which comprises transferring the second set of parameters from the second set of register fields to the first set of register fields.

* * * * *